United States Patent
Smith (10) Patent No.: US 6,992,626 B2
(45) Date of Patent: Jan. 31, 2006

(54) METHOD AND APPARATUS TO CORRELATE AIRCRAFT FLIGHT TRACKS AND EVENTS WITH RELEVANT AIRPORT OPERATIONS INFORMATION

(75) Inventor: Alexander E. Smith, McLean, VA (US)

(73) Assignee: Rannoch Corporation, Alexandria, VA (US)

( * ) Notice: Subject to any disclaimer, the term of this patent is extended or adjusted under 35 U.S.C. 154(b) by 0 days.

(21) Appl. No.: 10/751,115

(22) Filed: Jan. 5, 2004

(65) Prior Publication Data

US 2004/0246178 A1    Dec. 9, 2004

Related U.S. Application Data

(63) Continuation-in-part of application No. 10/638,524, filed on Aug. 12, 2003, which is a continuation-in-part of application No. 10/457,439, filed on Jun. 10, 2003, which is a continuation-in-part of application No. 10/319,725, filed on Dec. 16, 2002, which is a continuation of application No. 09/516,215, filed on Feb. 29, 2000, now Pat. No. 6,633,259.

(60) Provisional application No. 60/440,618, filed on Jan. 17, 2003, provisional application No. 60/123,170, filed on Mar. 5, 1999.

(51) Int. Cl.
*G01S 3/02* (2006.01)

(52) U.S. Cl. ........................... 342/454; 701/120

(58) Field of Classification Search ............... 342/454, 342/455, 456; 701/117, 120, 122
See application file for complete search history.

(56) References Cited

U.S. PATENT DOCUMENTS

| 3,668,403 A | * | 6/1972 | Meilander | 701/121 |
| 3,705,404 A | | 12/1972 | Chisholm | 343/112 R |
| 4,167,006 A | | 9/1979 | Funatsu et al. | 343/6.5 LC |
| 4,196,474 A | | 4/1980 | Buchanan et al. | 364/461 |
| 4,229,737 A | | 10/1980 | Heldwein et al. | 343/6 R |
| 4,454,510 A | | 6/1984 | Crow | 343/5 |
| 4,524,931 A | | 6/1985 | Nilsson | 246/167 |
| 4,688,046 A | | 8/1987 | Schwab | 342/456 |
| 4,782,450 A | | 11/1988 | Flax | 364/461 |

(Continued)

FOREIGN PATENT DOCUMENTS

JP    9-288175 A    11/1994

(Continued)

OTHER PUBLICATIONS

"ADSE and Multilateration Mode-S Data Fusion for Location and Identification on Airport Surface", J.G. Harraro J.A. Portas, F.J. Rodriguez,(*IEEE 1999 Radar Conference Proceedings*, pp. 315-320, Apr. 20-22, 1999).

(Continued)

*Primary Examiner*—Dao Phan
(74) *Attorney, Agent, or Firm*—Robert Platt Bell (57) ABSTRACT

AirScene™, through a unique fusion process, is the only NOMS system to provide such data, digitally, and in a form that is integrated with flight tracks, noise events, complaint, and operations data. Other systems provide only the flight track, noise event, and complaint, and a manual recording of various ATC frequencies. Therefore other approaches do not offer any type of automated correlation of operational information with noise and flight track data. AirScene™ offers users the ability to record, search and query vast numbers of records using all of the above parameters, where available.

41 Claims, 9 Drawing Sheets

| Combination | Low Visibility | TCAS Advisory | Low Ceiling | ATC Instruction | Event/ Incident | Possible Reason |
|---|---|---|---|---|---|---|
| 1 | N | N | N | N | Radar Problem at Airport | Pilot may have elected to switch runways. Radar service not available. |
| 2 | N | N | N | Y | Fuel spill on main runway | ATC instructed aircraft to switch runways, possibly due fuel spill. |
| 3 | N | N | Y | N | - | Aircraft did not meet criteria for IFR approach to that runway |
| .... | | | | | | |
| 9 | N | Y | N | N | - | Safety, loss of separation |
| ... | | | | | | |
| 11 | Y | N | Y | N | - | Aircraft did not meet criteria for IFR approach to that runway |
| ... | | | | | | |

U.S. PATENT DOCUMENTS

| | | | |
|---|---|---|---|
| 4,914,733 A | 4/1990 | Gralnick | 340/961 |
| 5,144,315 A | 9/1992 | Schwab et al. | 342/49 |
| 5,153,836 A | 10/1992 | Fraughton et al. | 364/461 |
| 5,191,342 A | 3/1993 | Alsup et al. | 342/465 |
| 5,262,784 A | 11/1993 | Drobnicki et al. | 342/45 |
| 5,365,516 A | 11/1994 | Jandrell | 370/18 |
| 5,374,932 A | 12/1994 | Wyschogrod et al. | 342/36 |
| 5,381,140 A * | 1/1995 | Kuroda et al. | 340/961 |
| 5,402,116 A | 3/1995 | Ashley | 340/870.1 |
| 5,454,720 A | 10/1995 | FitzGerald et al. | 434/28 |
| 5,528,244 A | 6/1996 | Schwab | 342/37 |
| 5,570,095 A | 10/1996 | Drouilhet, Jr. et al. | 342/357 |
| 5,596,326 A | 1/1997 | Fitts | 342/30 |
| 5,596,332 A | 1/1997 | Coles et al. | 342/455 |
| 5,627,546 A | 5/1997 | Crow | 342/352 |
| 5,629,691 A | 5/1997 | Jain | 340/961 |
| 5,680,140 A | 10/1997 | Loomis | 342/357 |
| 5,714,948 A | 2/1998 | Farmakis et al. | 340/961 |
| 5,752,216 A * | 5/1998 | Carlson et al. | 701/120 |
| 5,774,829 A | 6/1998 | Cisneros et al. | 701/213 |
| 5,781,150 A | 7/1998 | Norris | 342/357 |
| 5,867,804 A | 2/1999 | Pilley et al. | 701/120 |
| 5,999,116 A | 12/1999 | Evers | 342/36 |
| 6,049,304 A | 4/2000 | Rudel et al. | 342/357.08 |
| 6,085,150 A | 7/2000 | Henry et al. | 701/301 |
| 6,094,169 A | 7/2000 | Smith et al. | 342/465 |
| 6,133,867 A | 10/2000 | Eberwine et al. | 342/29 |
| 6,211,811 B1 | 4/2001 | Evers | 342/36 |
| 6,219,592 B1 | 4/2001 | Muller et al. | 701/9 |
| 6,292,721 B1 | 9/2001 | Conner et al. | 701/9 |
| 6,314,363 B1 | 11/2001 | Pilley et al. | 701/120 |
| 6,347,263 B1 | 2/2002 | Johnson et al. | 701/14 |
| 6,380,870 B1 | 4/2002 | Conner et al. | 340/970 |
| 6,384,783 B1 | 5/2002 | Smith et al. | 342/387 |
| 6,445,310 B1 | 9/2002 | Bateman et al. | 340/970 |
| 6,448,929 B1 | 9/2002 | Smith et al. | 342/456 |
| 6,469,664 B1 | 10/2002 | Michaelson et al. | 342/357.13 |
| 6,477,449 B1 | 11/2002 | Conner et al. | 701/4 |
| 6,571,155 B2 | 5/2003 | Carriker et al. | 701/3 |
| 6,606,034 B1 | 8/2003 | Muller et al. | 340/970 |
| 6,633,259 B1 | 10/2003 | Smith et al. | 342/456 |
| 2002/0009267 A1 | 1/2002 | Shirakawa | 701/4 |
| 2002/0021247 A1 | 2/2002 | Smith et al. | 342/450 |

FOREIGN PATENT DOCUMENTS

| | | | |
|---|---|---|---|
| JP | 6-342061 A | 12/1994 | |
| JP | 8-146130 A | 5/1996 | |
| JP | 9-119983 A | 11/1996 | |

OTHER PUBLICATIONS

D.C. Rickard, D.J.Sherry, S.J. Taylor, "The development of a prototype aircraft-height monitoring unit utilising an SSR-based difference in time of arrival technique", International Conference Radar 92 (Conf. Publ. No. 365), 1992, p 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal: Noise and Operations Monitoring System, Indianapolis Airport Authority, Indianapois, Indiana, Sep. 29, 2003.

Attachment A: Technical Specifications for a Aircraft Flight Track and Noise Managment System for the Regional Airport for the Regional Airport Authority of Louisville and Jefferson County, Harris Miller Miller & Hanson, Inc., May 19, 2003.

Application of CNS/ATM Technologies to Airport Management, Alex Smith and Jon Baldwin, Rannoch Corporation, Alexandria, Virginia.

Overview of the FAA ADS-B Link Decision, John Scardina, Federal Aviation Administration, Jun. 7. 2002.

Automated Correlation of Aircraft Flight Tracks and Events with ATC Data, Alex Smith, Rannoch Corporation, Alexandria, Virginia.

Department of Transportation Federal Aviation Administration System Specification, Ground-Based Transceiver (GBT) for Broadcast Services Using the Universal Access Transceiver (UAT) Data Link, FAA-E-2973, Jan. 15, 2004.

Traffic Alert System Technical Design Summary, Final Report, Apr. 1994 (Baldwin et al.).

Airscene, The complete Air Traffic Picture in Real Time, www.airscene.com, Rannoch Corporation, Alexandria, Virginia, undated.

GPS Relative Accuracy for Collision Avoidance, Institute of Navigation Technical Meeting, Jan. 1997 (Rudel et al.).

Cassell, R., Smith A., Cohen, B., Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J, Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

Aermod: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Customers Worldwide", Apr. 28, 2003, http://www.flightexplorer/com/News/press%20release/pr042803.asp.

Source Code received by Rannoch Corp. from FAA, circa 1998.

"A Routine that converts an American Mode S address into its corresponding 'N' number string", Ken Banis, Feb. 17, 1992.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

* cited by examiner

| Actual Transcript | Explanation |
|---|---|
| DuPage | Name of airport |
| ATIS Information "Echo" | Each time something in the recorded announcement changes, or at least once each hour, a new recording is made, and the alpha letter is assigned phonetically, in order. (e.g., Alpha, Bravo, Charlie...) |
| 1745 zulu | Time in 24 hour clock (UTC) also known as (GMT) or (ZULU). Subtract 5 hours for Central Daylight Savings Time. |
| Winds 310 at 8 | Wind direction and speed in knots. |
| Visibility 35 | Visibility in statue miles. |
| Sky condition, 5000 broken | Bottom of clouds at 5000 feet above the ground, 5 to 7 eights of the sky is obscured by clouds. |
| Temperature 27 | Temperature in degrees Celsius. |
| Dew point 15 | Dew point in degrees Celsius. Temperature at which condensation (rain, fog, etc.) will form. Temp./dew point spread within 3 degrees indicates high relative humidity. |
| Altimeter 30.16 | Current barometric pressure. |
| ILS approach runway 1 left and visual approaches are in use | Runways and types of approaches in use. |
| Landing and departing runway 1 left, 1 right, 33 | Runways in use. |
| VFR departures advise ground control direction of flight | Inform controller as to which direction you will travel from airport |
| IFR departures contact ground control prior to taxi for your clearances | Aircraft operating under Instrument Flight Rules must contact tower prior to taxing for instructions. |
| Notice to Airman | Critical information that affects flight planning |
| DuPage radar out of service | Radar at DuPage Airport out of service. |
| Runway 10, 28 closed | Runway closed |
| ILS to runway 10 out of service | The instrument landing system is out of service |
| Taxiway Golf closed between taxiway X-ray and taxiway Whisky | Portion of taxiway closed. |
| Taxiway Charlie closed South of taxiway Echo | Portion of taxiway closed. |
| Use caution for men and equipment on the field | Be alert for non-aviation activities (i.e. construction crews) |
| Advise on initial contact, you have "Echo" | Instructions for pilot to advise ATC that ATIS "name" has been received by the pilot. Controller will not have to repeat this information. |

Figure 3

| Country | Airport | ICAO Code | IATA Code | Service Provider |
|---|---|---|---|---|
| Austria | Innsbruck<br>Klagenfurt<br>Vienna | LOWI<br>LOWK<br>LOWW | INN<br>KLU<br>VIE | ARINC |
| Australia | Adelaide<br>Brisbane<br>Cairns<br>Melbourne<br>Perth<br>Sydney | YPAD<br>YBBN<br>YBCS<br>YMML<br>YPPH<br>YSSY | ADL<br>BNE<br>BCS<br>MEL<br>PER<br>CNS | SITA |
| Canada | Halifax<br>Ottawa<br>Toronto<br>Vancouver | CYHZ<br>CYOW<br>CYYZ<br>CYVR | YHZ<br>YOW<br>YYZ<br>YVR | ARINC, SITA |
| China | Hong Kong | VHHH | HKG | ARINC, SITA |
| Denmark | Aalborg<br>Copenhagen<br>Roskilde | EKYT<br>EKCH<br>EKRK | AAL<br>CPH<br>RKE | ARINC, SITA |
| Finland | Helsinki | EFHK | HEL | |
| France | Paris-Charles de Gaulle<br>Paris-Orly | LFPG<br>LFPO | CDG<br>ORY | ARINC, SITA |
| Germany | Berlin-Schonefeld<br>Berlin-Tempelhof<br>Berlink-Tegel<br>Bremen<br>Cologne/Bonn<br>Duesseldorf<br>Frankfurt<br>Hamburg<br>Hannover<br>Leipzig<br>Muenster/Osnabrueck<br>Munich<br>Nuremberg<br>Stuttgart | EDDB<br>EDDI<br>EDDT<br>EDDW<br>EDDK<br>EDDL<br>EDDF<br>EDDH<br>EDDV<br>EDDP<br>EDDG<br>EDDM<br>EDDN<br>EDDS | SXF<br>THF<br>TXL<br>BRE<br>CGN<br>DUS<br>FRA<br>HAM<br>HAJ<br>LEJ<br>FMO<br>MUC<br>NUE<br>STR | ARINC, SITA |
| Japan | Osaka<br>Tokyo-Narita<br>and other airports | RJBB<br>RJAA<br>++ | KIX<br>NRT<br>++ | Avicom |
| Norway | Oslo | ENGM | OSL | ARINC, SITA |
| Netherlands, the | Amsterdam | EHAM | AMS | |
| New Zealand | Auckland<br>Christchurch<br>Wellington | NZAA<br>NZCH<br>NZWN | AKL<br>CHC<br>WLG | ARINC, SITA |
| Portugal | Lisbon | LPPT | LIS | SITA |
| Singapore | Singapore | WSSS | SIN | SITA, ARINC |
| Sweden | Gothenburg-Landvetter<br>Stockholm-Arlanda<br>Stockholm-Bromma | ESGG<br>ESSA<br>ESSB | GOT<br>ARN<br>BMA | ARINC, SITA |
| Switzerland | Geneva<br>Zurich | LSGG<br>LSZH | GVA<br>ZRH | SITA, ARINC |
| Thailand | Bangkok<br>Chiang Mai<br>Hat Yai<br>Phuket | VTBD<br>VTCC<br>VTSS<br>VTSP | BKK<br>CNX<br>HDY<br>HKT | ARINC, SITA |
| UK | London-Heathrow<br>London-Gatwick | EGLL<br>EGKK | LHR<br>LGW | |
| USA | Chicago O'Hare<br>Newark<br>Seattle<br>+ 54 other major airports | KEWR<br>KORD<br>KSEA<br>++ | EWR<br>ORD<br>SEA<br>++ | ARINC, SITA |

Figure 4

Current Weather Conditions:
Washington DC, Washington-Dulles International Airport, VA, United States

(KIAD) 38-56-05N 077-26-51W 93M

| | |
|---|---|
| Conditions at | Dec 01, 2002 - 10:51 AM EST |
| | 2002.12.01 1551 UTC |

Wind from the W (280 degrees) at 22 MPH (19 KT) gusting to 30 MPH (26 KT)
Visibility 10 mile(s)
Sky conditions mostly cloudy
Temperature 34.0 F (1.1 C)
Windchill 21 F (-6 C)
Dew Point 12.9 F (-10.6 C)
Relative Humidity 41%
Pressure 30.02 in. Hg (1016 hPa)
(altimeter)
ob KIAD 011551Z 28019G26KT 10SM BKN047 01/M11 A3002 RMK AO2 PK WND 29026/1551 SLP167 T00111106

Maximum and Minimum Temperatures

| Maximum Temperature F (C) | Minimum Temperature F (C) | |
|---|---|---|
| 34.0 (1.1) | 28.9 (-1.7) | In the 6 hours preceding Dec 01, 2002 - 06:51 AM EST / 2002.12.01 1151 UTC |
| 55.0 (12.8) | 33.1 (0.6) | In the 24 hours preceding Nov 30, 2002 - 11:51 PM EST / 2002.12.01 0451 UTC |

Precipitation Accumulation

| Precipitation Amount | |
|---|---|
| A trace | In the 6 hours preceding Dec 01, 2002 - 12:51 AM EST / 2002.12.01 0551 UTC |
| 0.04 inches | In the 24 hours preceding Dec 01, 2002 - 06:51 AM EST / 2002.12.01 1151 UTC |

Figure 5

| 24 Hour Summary | | | | | |
|---|---|---|---|---|---|
| | Time EST (UTC) | Temperature F (C) | Dew Point F (C) | Pressure Inches (hPa) | Wind MPH | Weather |
| Latest | 11 AM (16) Dec 01 | 34.0 (1.1) | 12.9 (-10.6) | 30.02 (1016) | W 22 | |
| | 10 AM (15) Dec 01 | 30.9 (-0.6) | 12.0 (-11.1) | 30.01 (1016) | WNW 13 | |
| | 9 AM (14) Dec 01 | 32.0 (0.0) | 12.9 (-10.6) | 29.98 (1015) | Calm | |
| | 8 AM (13) Dec 01 | 30.9 (-0.6) | 12.0 (-11.1) | 29.95 (1014) | WNW 14 | |
| | 7 AM (12) Dec 01 | 30.0 (-1.1) | 10.0 (-12.2) | 29.92 (1013) | WSW 7 | |
| | 6 AM (11) Dec 01 | 30.0 (-1.1) | 15.1 (-9.4) | 29.89 (1012) | W 15 | |
| | 5 AM (10) Dec 01 | 30.0 (-1.1) | 12.0 (-11.1) | 29.84 (1010) | W 16 | |
| | 4 AM (9) Dec 01 | 30.9 (-0.6) | 14.0 (-10.0) | 29.82 (1009) | W 12 | |
| | 3 AM (8) Dec 01 | 32.0 (0.0) | 14.0 (-10.0) | 29.8 (1009) | WNW 12 | |
| | 2 AM (7) Dec 01 | 33.1 (0.6) | 19.0 (-7.2) | 29.79 (1008) | W 22 | |
| | 1 AM (6) Dec 01 | 34.0 (1.1) | 21.0 (-6.1) | 29.76 (1007) | W 13 | |
| | Midnight (5) Dec 01 | 34.0 (1.1) | 23.0 (-5.0) | 29.74 (1007) | WNW 20 | |
| | 11 PM (4) Nov 30 | 34.0 (1.1) | 26.1 (-3.3) | 29.73 (1006) | W 13 | |
| | 10 PM (3) Nov 30 | 35 (2) | 26 (-3) | 29.72 (1006) | W 10 | light snow |
| | 9 PM (2) Nov 30 | 37.9 (3.3) | 25.0 (-3.9) | 29.67 (1004) | NW 17 | |
| | 8 PM (1) Nov 30 | 39.9 (4.4) | 26.1 (-3.3) | 29.6 (1002) | WNW 22 | |
| | 7 PM (0) Nov 30 | 39.9 (4.4) | 32.0 (0.0) | 29.55 (1000) | W 14 | |
| | 6 PM (23) Nov 30 | 43.0 (6.1) | 30.9 (-0.6) | 29.54 (1000) | NW 22 | light rain |
| | 5 PM (22) Nov 30 | 44.1 (6.7) | 30.0 (-1.1) | 29.49 (998) | W 3 | |
| | 4 PM (21) Nov 30 | 46.9 (8.3) | 30.9 (-0.6) | 29.47 (997) | WNW 17 | |
| | 3 PM (20) Nov 30 | 44.1 (6.7) | 32.0 (0.0) | 29.44 (996) | WNW 10 | |
| | 2 PM (19) Nov 30 | 42 (6) | 32 (0) | 29.45 (997) | NW 16 | light rain |
| | 1 PM (18) Nov 30 | 51 (11) | 32 (0) | 29.4 (995) | NW 16 | light rain |
| Oldest | Noon (17) Nov 30 | 48.9 (9.4) | 32.0 (0.0) | 29.42 (996) | SSW 14 | |

Figure 6

| Combination | Low Visibility | TCAS Advisory | Low Ceiling | ATC Instruction | Event/ Incident | Possible Reason |
|---|---|---|---|---|---|---|
| 1 | N | N | N | N | Radar Problem at Airport | Pilot may have elected to switch runways. Radar service not available. |
| 2 | N | N | N | Y | Fuel spill on main runway | ATC instructed aircraft to switch runways, possibly due fuel spill. |
| 3 | N | N | Y | N | - | Aircraft did not meet criteria for IFR approach to that runway |
| .... | | | | | | |
| 9 | N | Y | N | N | - | Safety, loss of separation |
| ... | | | | | | |
| 11 | Y | N | Y | N | - | Aircraft did not meet criteria for IFR approach to that runway |
| ... | | | | | | |

METHOD AND APPARATUS TO CORRELATE AIRCRAFT FLIGHT TRACKS AND EVENTS WITH RELEVANT AIRPORT OPERATIONS INFORMATION

CROSS-REFERENCE TO RELATED APPLICATIONS

The present application is a Continuation-In-Part application of U.S. patent application Ser. No. 10/638,524, filed Aug. 12, 2003, entitled "METHOD AND APPARATUS FOR IMPROVING THE UTILITY OF AUTOMATIC DEPENDENT SURVEILLANCE", which is incorporated herein by reference in its entirety, which in turn is a Continuation of U.S. patent application Ser. No. 09/516,215, filed on Feb. 29, 2000, which in turn claims priority from Provisional Application Ser. No. 60/123,170, filed Mar. 5, 1999, both of which are incorporated herein by reference in its entirety.

The present application is also a Continuation-In-Part of U.S. patent application Ser. No. 10/319,725, filed Dec. 16, 2002, entitled "VOICE RECOGNITION LANDING FEE BILLING SYSTEM", incorporated herein by reference in its entirety.

The present application is also a Continuation-In-Part of U.S. patent application Ser. No. 10/457,439, filed Jun. 10, 2003 entitled "Correlation of Flight Track Data with Other Data Source", incorporated herein by reference in its entirety.

The present application also claims priority from Provisional U.S. Patent Application No. 60/440,618, filed Jan. 17, 2003, incorporated herein by reference in its entirety.

The subject matter of the present application is also related to that in U.S. Patent Application Ser. No. 10/743,042 entitled "METHOD AND APPARATUS FOR ACCURATE AIRCRAFT AND VEHICLE TRACKING" (Alexander E. Smith et al.), incorporated herein by reference.

The subject matter of the present application is related to the following issued U.S. Patents, assigned to the same assignee as the present invention, all of which are incorporated herein by reference in their entirety:

U.S. Pat. No. 6,049,304, issued Apr. 11, 2000, entitled "Method and Apparatus for Improving the Accuracy of Relative Position Estimates In a Satellite-Based Navigation System";

U.S. Pat. No. 5,999,116, issued Dec. 7, 1999, entitled "Method and Apparatus for Improving the Surveillance Coverage and Target Identification in a Radar Based Surveillance System";

U.S. Pat. No. 6,094,169, issued Jul. 25, 2000, entitled "Passive Multilateration Auto-Calibration and Position Error Correction";

U.S. Pat. No. 6,384,783, issued on May 7, 2002, entitled "Method and Apparatus for Correlating Flight Identification Data With Secondary Surveillance Radar Data";

U.S. Pat. No. 6,633,259, issued Oct. 14, 2003, entitled "METHOD AND APPARATUS FOR IMPROVING THE UTILITY OF AUTOMATIC DEPENDENT SURVEILLANCE";

U.S. Pat. No. 6,211,811, issued Apr. 2, 2001, entitled "Method and Apparatus for Improving the Surveillance Coverage and Target Identification in a Radar Based Surveillance System";

U.S. Pat. No. 6,448,929, issued Sep. 10, 2002, entitled "Method and Apparatus for Correlating Flight Identification Data With Secondary Surveillance Radar Data"; and U.S. Pat. No. 6,567,043, issued May 20, 2003, entitled "METHOD AND APPARATUS FOR IMPROVING THE UTILITY OF AUTOMATIC DEPENDENT SURVEILLANCE".

FIELD OF THE INVENTION

The present invention relates to a method and apparatus for tracking aircraft flight patterns. In particular, the present invention is directed toward a method and apparatus to correlate aircraft flight tracks and events with relevant airport operations Information.

BACKGROUND OF THE INVENTION

The AirScene™ system, developed by Rannoch Corporation of Alexandria Virginia, can track air traffic using multilateration and other techniques. Rannoch Corporation and its staff members have an extensive background in air traffic control, as well as noise operations and flight tracking, and thus has an understanding of not only how to detect and track aircraft and aircraft noise, but how to understand how and why aircraft noise is created and why aircraft follow particular tracks.

In order to try and understand the operations around an airport, the user must also understand what is happening at the airport. Simply looking at a real-time or recorded flight track and an associated noise event is only a part of the overall picture. While a Prior Art noise monitoring system might be able to tell the user how much noise is generated, and where, it may not tell the more important answer as to why the noise is generated and how it can be attenuated. Oftentimes various circumstances may create a scenario where noise is generated inadvertently.

The other major Noise Operations and Monitoring Systems (NOMS) on the market usually offer some form of flight tracking, correlation of noise event, and correlation with complaints. Most of the major NOMS systems, including AirScene™ allow some form of "gating" to automatically filter large numbers of flights where the user need only look at aircraft that exceeded certain parameters or transgressed certain boundaries.

For example, gating will automatically identify that an aircraft did not follow a standard instrument departure as it turned too early or the like. As the reader is likely aware these transgressions and exceedances occur many times on an ongoing basis at our nation's airports. The question is why?

For example, a user may wish to know why an aircraft turned 20 degrees west two miles earlier than the noise abatement procedure stated. Or why did the aircraft on approach to 27 Left go around two times before landing. Or why were northwest departures being used at night. Or why were cargo airlines using runway 24 between 4 and 6 am for departures. Any of these events may contribute to excessive noise. Without understanding a cause and effect relationship between these events and the noise created, it may be difficult to reduce noise around an airport.

Answers to these and many other similar questions are often based on a combination of many factors. Airport Operations may be an underlying cause of noise problems, as operations on the ground may force a pilot to alter his approach in a manner which may violate noise reduction edicts. Examples of airport operations parameters may include: Runways and types of approaches in use; Runway category of operation (Category I, II, III); Runway visual range (visibility on each runway); Airports operating in instrument of visual conditions (IFR/VFR operations); NOTAMS in effect ("notices to airmen"); Status of radar services at the airport and other nearby airports; Runways that are closed; Portions of taxiways that are closed; Construction crews working at the airport; Average runway occupancy time by aircraft type; and Average taxi time by aircraft type.

Another factor to consider is airport weather conditions. These conditions may include: Wind speed, directions, gusting; Wind shear alert; Visibility; Precipitation; Snow; Runway conditions, standing water, ice, and the like; Cloud ceiling; Temperature; and Dew point. Yet another factor to consider may include Air Traffic Control (ATC) Instructions. These instructions may include NOTAM instructions, Aircraft clearances, and Aircraft directions.

Another factor may include Aircraft Equipage, which may include: Aircraft approved category to land (Category I, II, III); Flight Management Systems (FMS); Aircraft Communications, Addressing and Reporting System (ACARS); Glass cockpit; Traffic Alert and Collision Avoidance System (TCAS); and Head Up Display (HUD).

In the Prior Art, all of this data was not available. Correlating aircraft flight tracks, noise data, and other related aircraft, airport, and environmental data, would require difficult and time-consuming manual labor. Making the connection between conditions on the ground, for example, and a noise event may have proved difficult. Prior Art noise monitoring systems could do little other than determine which aircraft are in violation of noise rules—without determining the underlying causes of the noise violations.

What remains a requirement in the art, therefore, is a system which can acquire and store all types of aircraft, airport, and environmental data, as well as aircraft tracking and noise data, and allow a user to correlate or filter such data to discover trends between different data scenarios. And thus a requirement remains in the art for a system that not only tracks aircraft flight, departure, and arrival patterns, but also a system which can provide information as to why such patterns occur.

SUMMARY OF THE INVENTION

Depending on the equipage at a particular airport, AirScene™ of the present invention may provide the above information, automatically and digitally. Therefore, answers may be available to the question noted above.

For example, a possible answer to the question, "Why did the aircraft turn 20 degrees west two miles earlier than the noise abatement procedure stated?" might be that the aircraft is an older DC-8 cargo aircraft, with no Flight Management System (FMS), which was unable to closely follow the advanced departure path for the recommended noise abatement procedure.

Similarly, the possible answer to the question "Why did the B-737 on approach to Runway 27 Left go around two times before landing?" might be that marginal Category I visibility and ceiling conditions existed, and the aircraft was equipped for Category I operations only. The Aircraft performed a go-around until both ceiling and visibility requirements were met. Otherwise the aircraft would have re-directed to another airport.

A possible answer to the question of "Why were northwest departures being used at night?" might be taxiway and runway maintenance. A possible answer to the question of "Why where the cargo airlines using runway 24 between 4 AM and 6 AM for departures?" might be a fuel spill on main runway.

The answers to these questions may allow airport operators, planners, pilots, and airline operators to better manage airport, airline, and airplane operations so as to reduce instances of noise violations and better manage airport operations. Having ongoing automated access to data on airport operations, airport weather, ATC instructions, and aircraft equipage allows airport management to understand why certain operations are happening and causing complaints, not just to observe the effects.

AirScene™, through a unique data fusion process, is the only NOMS system to provide such data, digitally, and in a form that is integrated with flight tracks, noise events, complaint, and operations data. Other systems provide only the flight track, noise event and complaint data, and a manual recording of various ATC frequencies. Therefore other approaches do not offer any type of automated correlation of operational information with noise and flight track data. AirScene™ offers user's the ability to record, search and query vast numbers of records using all of the above parameters, where available.

BRIEF DESCRIPTION OF THE DRAWINGS

FIG. 3 is a transcript of an actual recording of an ATIS report made at DuPage Airport, West Chicago, Ill. in July 1996.

FIG. 4 is a table listing examples of airports using ACARS for D-ATIS as of 2002.

FIG. 6 is a 24-hour weather sample taken from http://weather.noaa.gov/weather/current/KIAD.html.

DETAILED DESCRIPTION OF THE INVENTION

AirScene™ through a unique data fusion process is the only NOMS system to provide such data, digitally, and in a form that is integrated with flight tracks, noise events, complaint, and operations data. Other systems provide only the flight track, noise event and complaint data, and a manual recording of various ATC frequencies. Therefore other approaches do not offer any type of automated correlation of operational information with noise and flight track data. AirScene™ offers users the ability to record, search and query vast numbers of records using all of the above parameters, where available. For example, using this unique fusion process it is possible to run the following query combinations as illustrated in FIG. 1.

Figure 1:
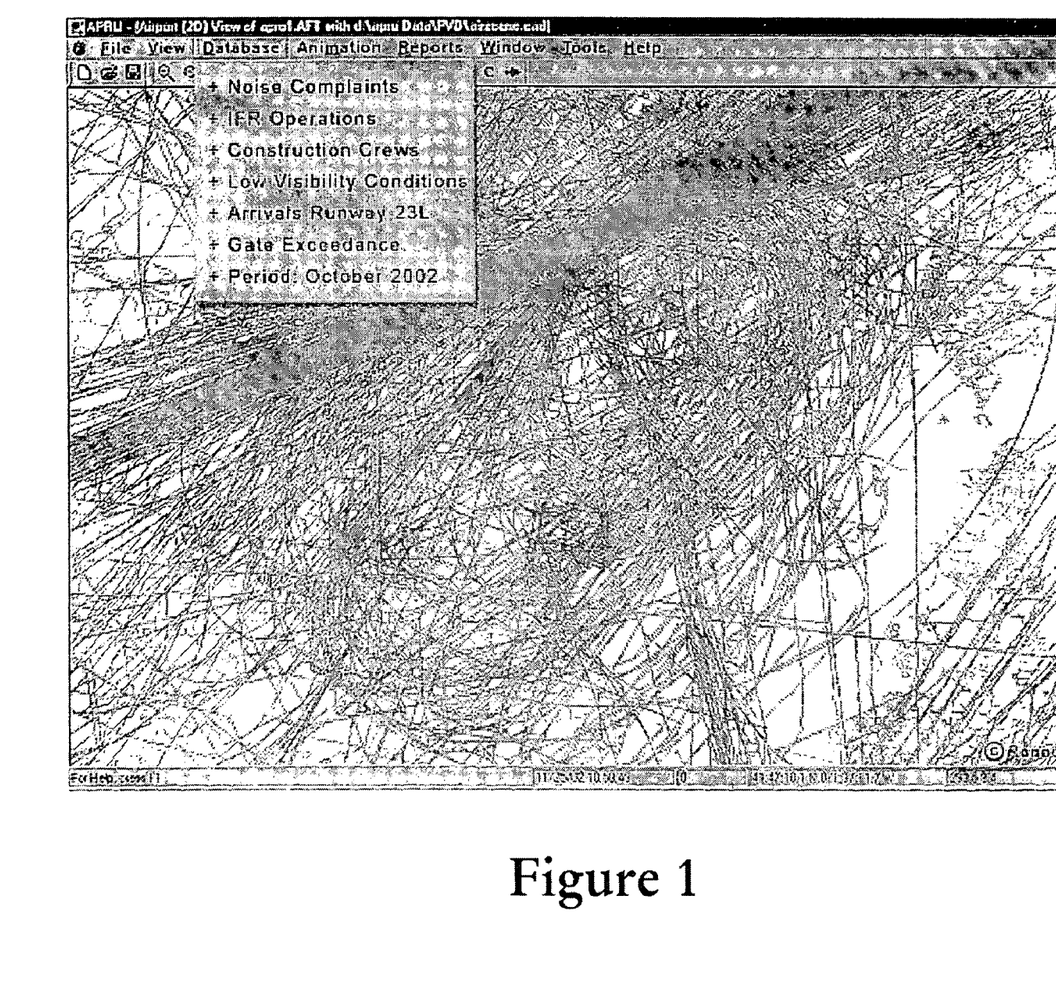
FIG. 1 is an example of a data query, which identifies those aircraft that exceeded gate parameters when conducting IFR landings to runway 23L, and when noise complaints were recorded and there was construction at the airport.

FIG. 1 is an example of a data query, which identifies those aircraft that exceeded gate parameters when conducting IFR landings to runway 23L, and when noise complaints were recorded and there was construction at the airport. Through the graphical user interface (GUI) of AirScene™ as illustrated in FIG. 1, a user may select data types for which to filter aircraft tracking data. The resultant data may be compared to periods when there was not ongoing construction to determine whether certain construction were causing noise complaints. If this was the case the airport may look to see, for example, if Air Traffic Control (ATC) had changed arrival procedures to runway 23L as a result of the construction.

Figure 2:
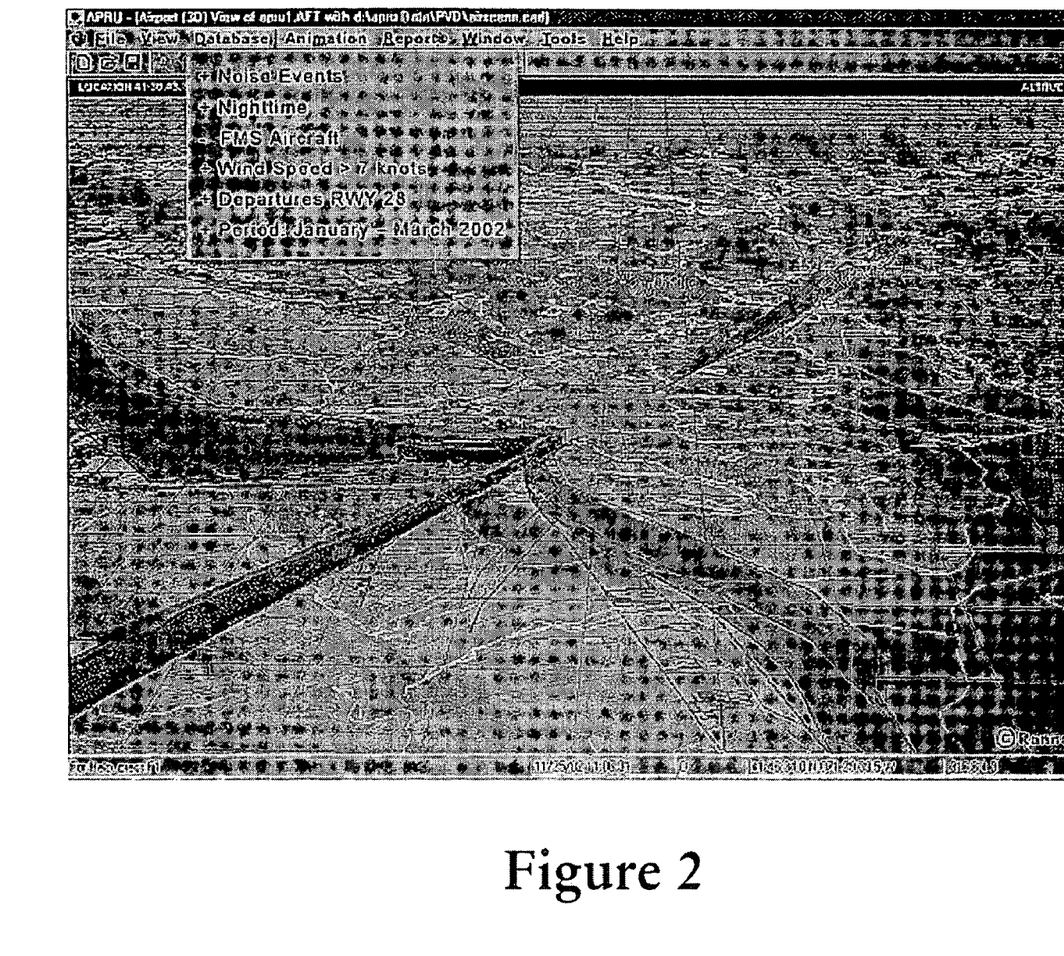
FIG. 2 is an example of a query, which identifies flight paths of aircraft exceeding noise event parameters when conducting night departures for runway 28R during a predetermined period of January through March 2002.

FIG. 2 is an example of a query that identifies flight paths of aircraft exceeding noise event parameters when conducting night departures for runway 28R during a predetermined period of January through March 2002 for aircraft not equipped with Flight Management Systems (FMS). By selecting various filtering parameters from the drop-down menu in the AirScene™ GUI, the user can quickly generate a graphical representation of flight tracks meeting the filtering criteria. In the example of FIG. 2, it may be determined, for example, that the lack of a Flight Management System in the aircraft during nighttime cross-wind landings, may have resulted in deviations from the preferred noise abatement approaches.

Aircraft flight track data, as well as noise data may be acquired using any one of the number of techniques disclosed in the co-pending and issued Patents to Rannoch Corporation cited above. These Patents and pending applications describe various aspects of embodiments of the AirScene™ system sold by Rannoch Corporation which provides flight track data, generally though use of multilateration techniques. The present invention represents an improvement to the AirScene™ system in that it allows AirScene™ flight track data to be fused with data from other sources.

These other sources may provide data in a number of formats, either electronically, or they may be manually entered. Examples of such data sources are described as follows. The present invention is not limited to these data sources, but may also include other data sources within the spirit and scope of the present invention.

A first source of data is the conventional Voice Automated Terminal Information Service (ATIS). ATIS comprises recorded information, which is broadcast continuously over designated frequencies. The air traffic control tower prepares this information to provide arriving and departing traffic information pertaining to active runways, weather conditions and notices to airmen (NOTAMS). The wind information in an ATIS transmission is given in a magnetic direction. When airport conditions change, the tower will record a new report.

When an ATIS is recorded it is assigned a letter using the phonetic alphabet. When calling the tower, ground control or approach control a pilot may advise that he or she has "information Charlie". This indicates to the controller that the pilot has heard the latest ATIS transmission and the controller need not repeat it. FIG. 3 is a transcript of an actual recording of an ATIS report made at DuPage Airport, West Chicago, Ill. in July 1996. The table provides a description of the contents of this particular ATIS report as illustrated in FIG. 3.

ATIS broadcasts originate from most major airports. The frequency can be found on any aeronautical chart next to the symbol for the airport. If an ATIS exists, the frequency will be shown next to the letters "ATIS". From the Aeronautical Information Manual (AIM), ATIS is defined as "The continuous broadcast of recorded non-control information in selected terminal areas. Its purpose is to improve controller effectiveness and to relieve frequency congestion by automating the repetitive transmission of essential but routine information."

Another example of an analog voice recorded ATIS Broadcast for Cleveland might be as follows:

"Cleveland Hopkins Information India,
1755 Zulu Automated Weather
Wind 260 at 15 gust 19
Visibility 6, light snow
2,600 broken, 3,500 overcast
Temperature −5
Dew point −11
Altimeter 2999
ILS runway 23 left approach in use
Landing runway 23 left
Departing runway 23 right
Notice to airmen, runway 18 closed
Read back all runway assignments and hold short instructions
Use caution for birds in the vicinity of the active runway
Advise the controller on initial contact, you have India"

The Cleveland ATIS Broadcast quoted above may be summarized as follows in Table A:

TABLE A

| Topic | Example |
| --- | --- |
| ATIS information identifier letter | Information India |
| Time of Report | 1755 Zulu |
| Wind Direction/Speed | 260 at 15 gusting to 19 |
| Visibility | 6 miles, light snow |
| Ceiling | 2,600 Scattered, 3,500 Overcast |
| Temperature | −5 |
| Dew Point | −11 |
| Altimeter | 29.99 |
| Instrument Approach and Runways in use | ILS (Instrument Landing System) runway 23 Left in use Landing 23 Left, Departing 23 Right |
| Notices to Airmen Taxiway/runway closures, lights, etc. | Runway 18 closed |

This data may be generated electronically at each airport and broadcast in voice form using a speech generation system. Alternately, recorded or live broadcasts may be used. In the present invention, this data may be entered into the system manually, or may be electronically entered using voice recognition systems or the like, or via electronic link to the airport control tower. Regardless of the link used, the ATIS represents a source of airport and environmental data, which the present invention may use for data fusion and correlation with aircraft tracking data.

Another source of similar information is the Digital Automated Terminal Information Service (D-ATIS). In order to more effectively make use of bandwidth, airports are now making ATIS information available digitally over data links. These services allow pilots of participating aircraft to receive airport status and weather information for any participating airports. The Aircraft Communications and Reporting System (ACARS) is one of the data links being used for the transfer of D-ATIS. The table in FIG. 4 lists examples of airports using ACARS for D-ATIS as of 2002.

D-ATIS has several advantages over voice ATIS. It is available regardless of the airplane's distance from the airport. Voice ATIS is only available within VHF range of the airport. The pilot gets a clear printout of the ATIS information. Poor quality of voice transmissions and accent problems are avoided. It also saves time during a period of high workload in the cockpit. D-ATIS also provides a means by which ATIS data can be electronically input into the AirScene™ system of the present invention. Local airport data can be input into the AirScene™ system using an existing data link. Alternately, airport data for remote airports can be input into the AirScene™ system if data analysis for a remote airport or airports is desired.

The following is an example of D-ATIS message from Copenhagen Airport (EKCH), Denmark:

EKCH ARR ATIS U
1450Z
EXP EXP ILS APP
RWY 22L
COND RWY WET WITH PATCHES
TRL 55
REDUCED SEPARATION
PROCEDURES APPLIED ON
FINAL.

The following is an example of D-ATIS message from Frankfurt Airport (EDDF), Germany:

EDDF ARR ATIS C
1620Z-ATIS C RWY: 25/18
TL:60 SR:0513 SS:1724
ETOU RWY:26
METAR 241620 EDDF
18006KT
A:1500P B:1500P C:1500P
E:1500P F:1500P G:1500P
I:1500P K:1500P L:15
00P
-CAVOK 24/11
-1016
-NOSIG
COMMENTS: WIND 18:
19003KT VIS: 70KM

The following is an example of D-ATIS message from Newark Airport
(KEWR), USA:
KEWR ARR ATIS 0
1751Z EWR ATIS INFO O 1751Z.
16010KT 9SM FEW018 BKN080 23/18 A3008 (THREE ZERO ZERO EIGHT).
ILS RWY 22L APCH IN USE.
DEPARTING RWY 22R.
RWY 11/29 CLSD.
NORTH 4 HUNDRED AND FIFTY FEET OF RY 22R CLSD.
RY 22R ALD 9 THOUSAND 5 HUNDRED AND FIFTY.
RY 22R DEPARTURES AUTHORIZED FROM INTERSECTION Y,
AVAILABLE DEPARTURE DISTANCE 9 THOUSAND 5 HUNDRED AND FIFTY.
COA RAMP PROCEDURES IN EFFECT.
READBACK ALL RUNWAY HOLD SHORT INSTRUCTIONS.
USE CAUTION FOR BIRDS AND CRANES IN THE VICINITY OF EWR.
. . . ADV YOU HAVEINFO O.57DE The D-ATIS data includes not only weather data, but also airport data such as runway closings and the like. Other potential sources for airport specific weather data includes Airport Weather Observation Systems (AWOS), Low Level Wind shear Alert Systems (LLWAS). Use of the Aircraft Communication Addressing and Reporting System (ACARS) for correlating data is found in U.S. Pat. Nos. 6,384,783 and 6,448,929, cited above.

Figure 5:
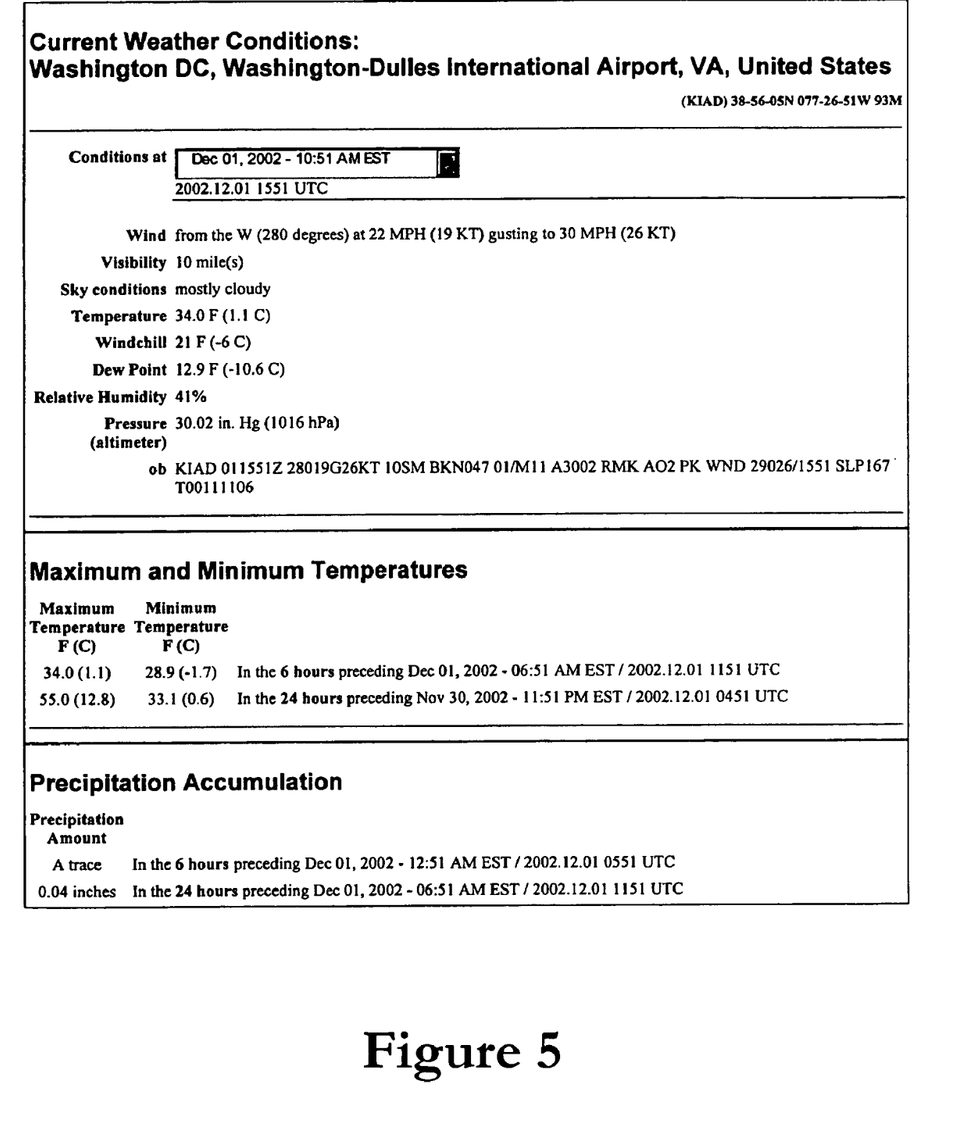
FIG. 5 is a weather sample taken from http://weather.noaa.gov/weather/current/KIAD.html.

Internet sources exist for current weather at airports, including in the United States the U.S. Department of Commerce National Oceanic and Atmospheric Administration (NOAA). A weather sample from http://weather.noaa.gov/weather/curret/KIAD.html is illustrated in FIGS. 5 and 6.

Yet other sources for data for the present invention may include Terminal Aerodrome Forecast (TAF) and METAR, the latter of which is a French acronym for Routine Aviation Weather Report. Some of the data in TAF and METAR may be redundant when compared with Digital ATIS. However, at airports that do not have Digital ATIS, TAF and METAR data may be especially useful. TABLE B illustrates a sample of weather summary data for KPHX (Phoenix Sky Harbor Airport) illustrating METAR and TAF forecast data.

TABLE B

| KPHX | Data Messages |
|---|---|
| METAR | METAR KPHX 121356Z 11006KT 10SM CLR 27/07 A2991 RMK AO2 SLP110 T02670067 |
| TAF | TAF KPHX 121120Z 121212 12004KT P6SM SKC FM1800 VRB05KT P6SM SKC TEMPO 2101 29006KT FEW110 FM0100 29005KT P6SM SKC |
| D-ATIS | PHX ATIS INFO N B8 10006KT 10SM CLR 27/07 A2991 TWO NINER NINER ONE. RWY 8, RWY 7L IN USE. SIMUL APCHS IN USE. EXPECT FWY VIS RWY 7L OR VIS APCH RWY 8. ACFT FROM NORTH EXPECT RWY 8 ACFT FROM SOUTH EXPECT RWY 7R. NOTAMS . . . RWY 7R CLSD . . . ADVS you have INFO N . . . |

TABLE C

| KPHX | Latest METAR | TAF Forecast | | | |
|---|---|---|---|---|---|
| WHEN (Z) | 13:56 | 12:00–18:00 | 18:00–21:00 | 21:00–01:00 | 01:00–12:00 |
| WIND | 110° at 6 KT | 120° at 4 KT | Variable° at 5 KT | Variable° at 5 KT TEMPORARY: 290° at 6 KT | 290° at 5 KT |
| VISIBILITY | 10 MILES | 6+ MILES | 6+ MILES | 6+ MILES | 6+ MILES |
| WEATHER | None | None | None | None | None |
| CLOUDS | SKY CLEAR | SKY CLEAR | SKY CLEAR | SKY CLEAR TEMPORARY: FEW at 11,000 FT | SKY CLEAR |
| TEMP | 27° Celsius | | | | |
| DEWPOINT | 7° Celsius | | | | |
| ALTIMETER | 29.91 | | | | |

Table C illustrates a sample of weather and operations data available from KPHX (Phoenix Sky Harbor Airport) using METAR, TAF and D-ATIS data sources. METAR data may be obtained from http://weather.noaa.gov/weather/metar.shml.

Table D. illustrates a sample of weather data available from KSDL (Scottsdale, Ariz. Airport) As illustrated in Table D, only METAR data is available from this airport.

TABLE D

| KSDL | Data Messages |
|---|---|
| METAR | METAR KSDL 121353Z 00000KT 10SM CLR 22/11 A2994 RMK AO2 SLP115 T02170111 |
| TAF | not available |
| D-ATIS | not available |

Figure 8:
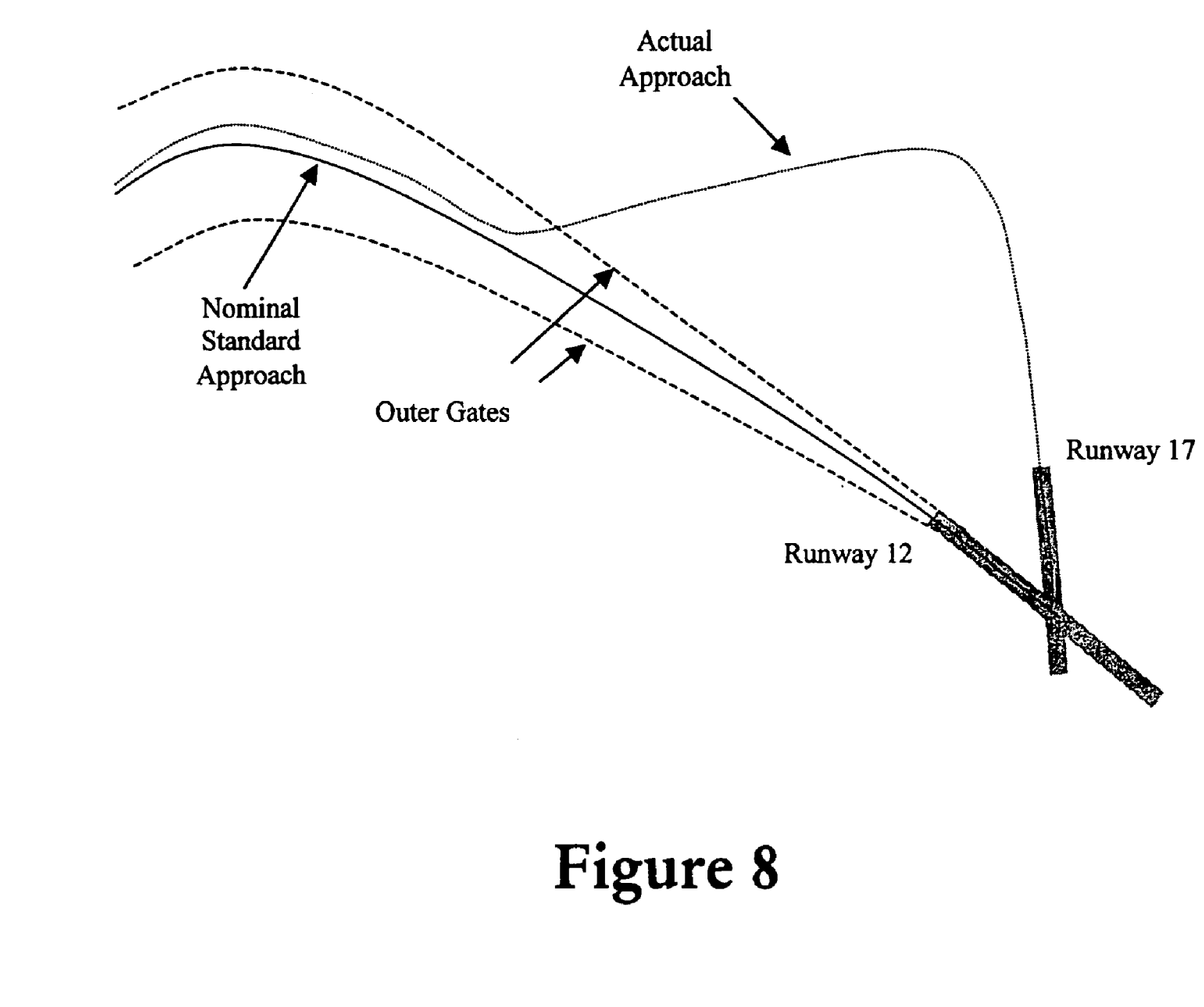
FIG. 8 is a diagram illustrating approach paths in an example where the airport is running standard approaches into Runway 12.

Once data has been obtained from one or more of the data sources listed above (or other data sources within the spirit and scope of the present invention) correlation of operational events and operational information take place. FIG. 8 illustrates an example where the airport is running standard approaches into Runway 12. The nominal standard approach is shown from the southwest to the airport. Note that most airports have multiple standard approaches and only one is shown for this example.

Gates are shown to bound nominal flight paths, and the user can select gates which represent a statistical arrival pattern, which in this example may be set at 99.9%, which is roughly equivalent to three times the standard deviation.

On an automated basis these gates would declare an operational event when an aircraft exceeded this pattern or blundered through the gates. In the example shown below, the aircraft on approach is shown as following the nominal path and then at some point on the approach the aircraft heads northeast, approaches and lands on Runway 17. Since the aircraft exceeded the gate limits, this event would then be logged accordingly.

In this example, it is assumed that the aircraft in FIG. 8 also violated the airport noise abatement procedure, as approaches to Runway 17 are not permitted between 10 PM and 7 AM. If the airport received noise complaints about this event, the airport may be able to automatically identify the aircraft but could not automatically identify the reason for the last minute runway change. Thus, in the Prior Art, if the airport wanted to follow-up on the reason for the deviation it would have to manually talk with tower personnel and perhaps the aircrew. This would be unreasonable at a busy airport that receives thousands of complaints per year.

The exceedance described in FIG. 8 is a particular example and a list of aircraft approach exceedances can be found in Cassell, R., Smith A., Cohen, B., Yang, E., Sleep, B., A Prototype Aircraft Performance Risk Assessment Model, Final Report, Rannoch Corporation, Feb. 28, 2002 and Cassell, R., Smith A., Cohen, B., Yang, E., Sleep, B., Esche, J., Aircraft Performance Risk Assessment Model (APRAM), Rannoch Corporation, Nov. 30, 2002, both of which are incorporated herein by reference. Other exceedances that may be incorporated into this approach include speed, altitude, lateral (short duration), as well as lateral (long duration) as is illustrated in FIG. 8. Any one of these exceedances can be used as a filtering event to correlate aircraft, airport, and environmental data.

Figure 9:
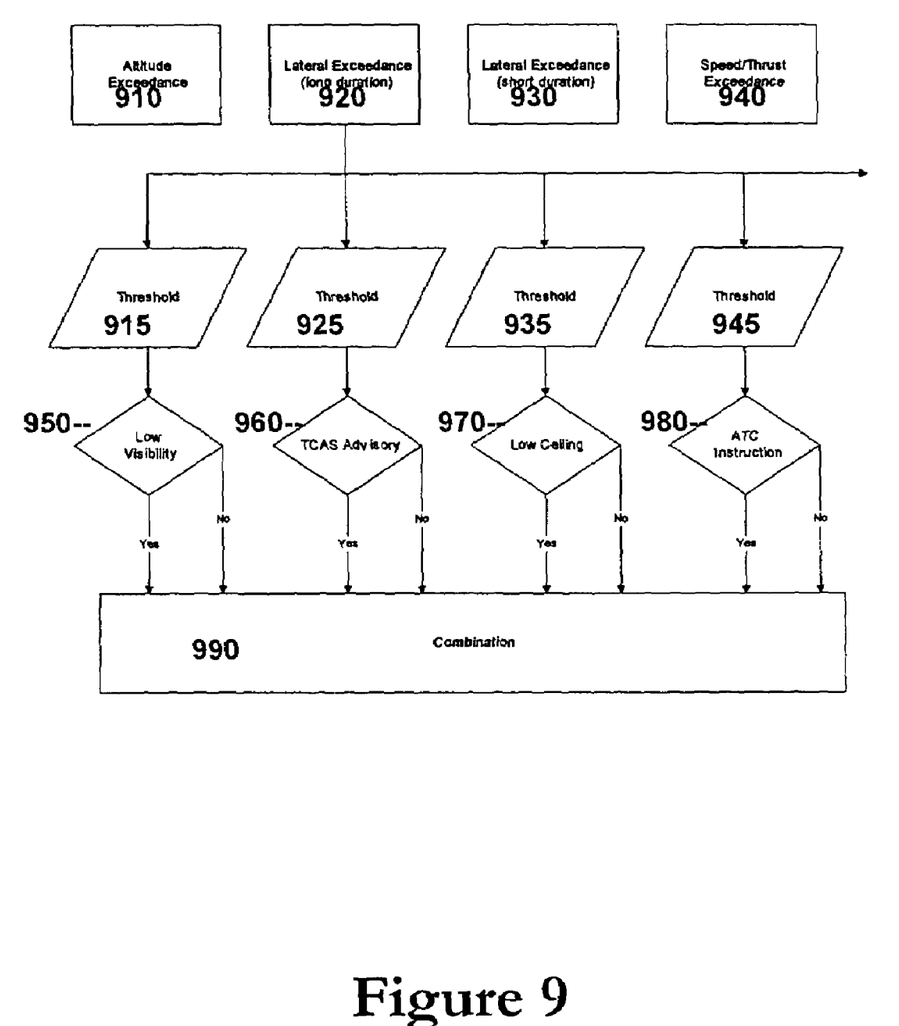
FIG. 9 is an example of Logic used to Classify Operational Events.

FIG. 9 is an example of Logic used to Classify Operational Events. These events may include altitude exceedance 910 which may include instances where an aircraft varies from its assigned altitude by a predetermined parameter. Lateral exceedance (long duration) 920 may include instances where an aircraft varies from its assigned flight path for extended periods of time (as in the Example of FIG. 8).

Lateral exceedance (short duration) 930 may include events where an aircraft exceeds its assigned flight path for short periods of time, but is quickly corrected. Speed/thrust exceedance 940 indicates events where an aircraft exceeded its assigned speed by a particular margin or expected thrust (as determined by acceleration and/or rate of climb) by a predetermined margin.

Continuing with the example of the long duration lateral deviation of FIG. 8, the D-ATIS and other information is collected and analyzed. Thresholds 915, 925, 935, and 945 are preset for different parameters. For example the low ceiling parameter 970 may be given assigned value for the airport as well as "low" visibility. Thus, what constitutes "low ceiling" may vary from airport to airport or may be adjusted.

Similarly, other parameters such as "low visibility" 950 may be determined by threshold 915. TCAS advisory 960 may be determined by threshold 925. ATC instruction may be determined by threshold 945. When each of these data elements exceeds a threshold parameter or equals a predetermined value, the value may be combined in step 990 to form query results.

Note that all of the raw data area available for sorting by the airport but the establishment of present thresholds allows the system to automatically give possible classifications of operational situations. Note also that the thresholds, data sources, and parameters illustrated in FIG. 9 are by way of example only and are not limiting within the spirit and scope of the present invention.

Figure 7:
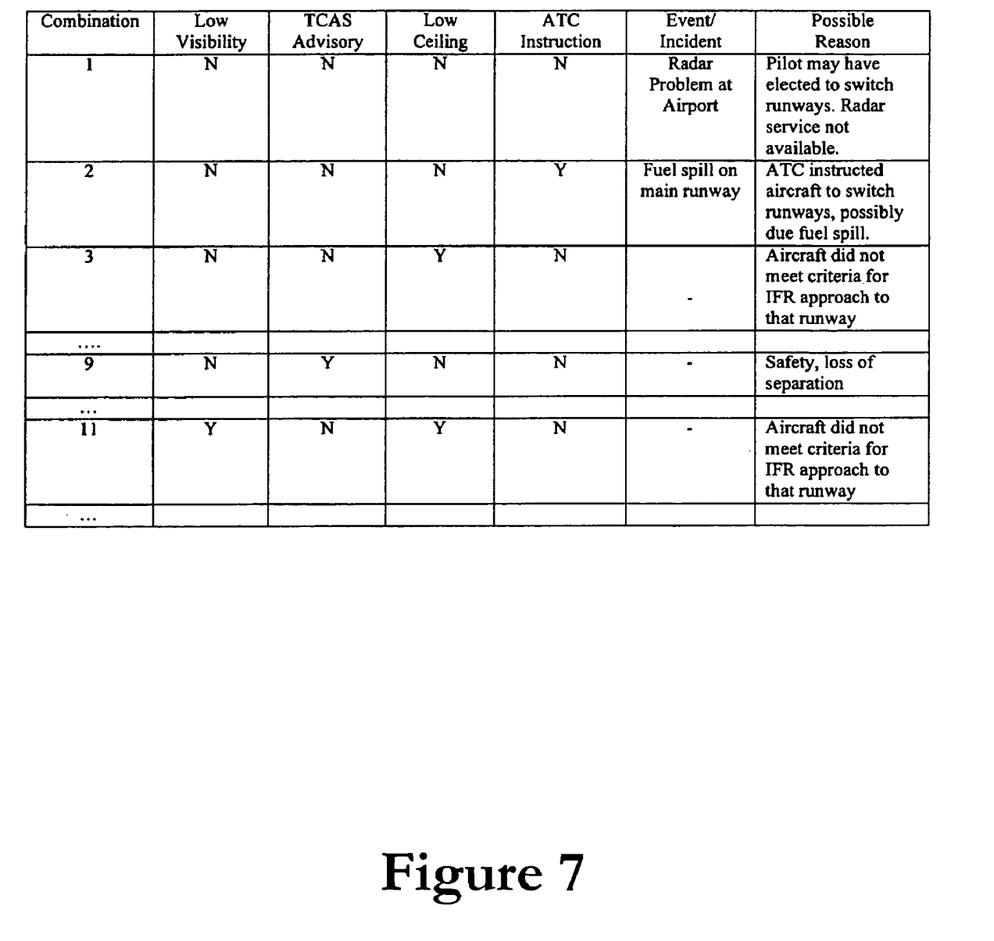
FIG. 7 is a table illustrating the combinations and automatic classifications possible with the logic of FIG. 9.

In the above example, which shows only a sample of operational parameters, the combinations and automatic classifications illustrated in FIG. 7 are possible. FIG. 7 is a table illustrating the combinations and automatic classifications possible with the logic of FIG. 9.

As illustrated in FIG. 7, the event information may contains occurrences at the airport, such as fuel spills, construction activities, or problems with ATC equipment, such as Radar. Possible reasons are given based on an auto-sort of information. In some possible combinations the reason seems quite clear, such as the aircraft TCAS received a warning and the pilot took evasive action to maintain aircraft separation.

If this was prevalent at the airport in certain conditions the airport could analyze the operational procedures in a given set of conditions to determine whether the number of go-arounds or missed approaches could be minimized. Some of the scenarios may need further information such as scenario or combination 2, where the aircraft was instructed to switch runways. This could be provided automatically from the other information from sources such as D-ATIS, for example a fuel spill on the main runway, or another aircraft occupying the main runway.

The present invention may thus provide an automated correlation of cause and effect for airport noise and other events. As stated previously, due to the high number of operations at airports, any system that correlates the effect (flight track exceedance, noise event, and the like) with the cause (weather, operational procedure, incident, and the like) may need to do so in an automated fashion. This is accomplished in the present invention by applying knowledge-based rules to the combination of events at the airport. Knowledge-based rules apply the operational experience to the combination of events.

For example, a TCAS traffic advisory or resolution advisory flowed by the pilot breaking off an approach means that it is highly likely the pilot decided to go around or conduct a different approach after receiving the TCAS warning and being concerned about loss of separation from other aircraft. Like wise, any runway change for landing after a warning is issued for fuel spill, construction, or weather event is likely because the pilot wanted to avoid to potential problems on the main runway. High crosswinds on certain runways would also likely cause changes in landing procedures at the airports.

More information on the application of knowledge-based rules to exceedance analysis is provided in Cox, E., A., Fuzzy Logic For Business and Industry, Charles River Media, 1995 and Smith, A., Cassell, R., Cohen, B., An approach to Aircraft Performance Risk Assessment Modeling, Final Report, Rannoch Corporation, March 1999, both of which are incorporated herein by reference. Knowledge-based rules may be enhanced as the system learns from various data events. If a previously unknown cause-effect scenario occurs, the cause can be entered into the system, and subsequent events with similar data features then properly analyzed.

While the preferred embodiment and various alternative embodiments of the invention have been disclosed and described in detail herein, it may be apparent to those skilled in the art that various changes in form and detail may be made therein without departing from the spirit and scope thereof.

For example, while disclosed in the primary embodiment as using multilateration data to determine aircraft flight track, other types of aircraft tracking systems, including air traffic control radar, may be used without departing from the spirit and scope of the present invention.

Within the spirit and scope of the present invention, different ways may be used to obtain the operational data. Once the system obtains the operational data it may be correlated with flight data in real-time or afterwards (post processing). For example it is possible to get the data directly at the airport off-air using a receiver, or it is possible to get it from other central sources such as FAA networks or third party networks, such as the ARINC SkySource or WebASD network. (www.arinc.com).

Before the development of the present invention, the industry has only considered a data feed from standalone airport noise weather systems such as the Airport Surface Observation System (ASOS). This was specified as a data feed in some specifications for airports, for example in the Specifications for a Noise and Operations Monitoring System for Louisville International Airport, developed by Noise Consultants HMMH, in mid 2003. (See, e.g., TECHNICAL SPECIFICATIONS for an AIRCRAFT FLIGHT TRACK AND NOISE MANAGEMENT SYSTEM for the REGIONAL AIRPORT AUTHORITY OF LOUISVILLE AND JEFFERSON COUNTY, Harris Miller, Miller & Hanson Inc. 15 New England Executive ParkBurlington, Mass. 01803 HMMH Report No. 298950, incorporated herein by reference).

Rannoch Corporation was selected for this contract and started work in September 2003, where they implemented a system using the D-ATIS data. Based on the utility of this approach the HMMH noise consultants then incorporated the requirement for a D-ATIS feed as part of the noise system in their next set of Specifications, for Indianapolis International Airport, which was released in November 2003. (See, e.g., NOISE AND OPERATIONS MONITORING SYSTEM INDIANAPOLIS AIRPORT AUTHORITY INDIANAPOLIS INTERNATIONAL AIRPORT 2500 S. HIGH SCHOOL ROAD, SUITE 100 INDIANAPOLIS, INDIANA 46241 October 2003, incorporated herein by reference). Thus, applicant's invention has demonstrated success in the commercial marketplace by satisfying a long-felt need in the industry.

What is claimed is:

1. A system for automatically providing combined digital data in a form integrated with at least one of flight tracks, noise events, and complaint data, the system comprising:
   means for receiving flight track data;
   means for comparing the flight track data to a set of predetermined parameters to determine if an event has occurred and producing event data;
   means for receiving at least one of ATIS, D-ATIS, AWOS, LLWAS, TCAS, ACARS and airport operations data; and
   means for applying knowledge-based rules to the event data and the at least one of ATIS, D-ATIS, AWOS, LLWAS, TCAS, ACARS and airport operations data to determine possible causes of the event.

2. The system of claim 1, wherein said means for receiving flight track data comprises a multilateration system for determining aircraft flight track by multilaterating radio signals received from the aircraft.

3. The system of claim 1, wherein said means for receiving flight track data comprises a passive radar system.

4. The system of claim 1, wherein said means for receiving flight track data comprises an air traffic control radar.

5. The system of claim 1, wherein said means for comparing the flight track data to a set of predetermined parameters to determine if an event has occurred and producing event data comprises:
   means for detecting altitude exceedance of a flight track from a predetermined flight path.

6. The system of claim 1, wherein said means for comparing the flight track data to a set of predetermined parameters to determine if an event has occurred and producing event data comprises:
   means for detecting a long duration lateral exceedance of a flight track from a predetermined flight path for more than a predetermined period of time.

7. The system of claim 1, wherein said means for comparing the flight track data to a set of predetermined parameters to determine if an event has occurred and producing event data comprises:
   means for detecting a short duration lateral exceedance of a flight track from a predetermined flight path for less than a predetermined period of time.

8. The system of claim 1, wherein said means for comparing the flight track data to a set of predetermined parameters to determine if an event has occurred and producing event data comprises:
   means for detecting at least one of a speed or thrust exceedance of a flight track from a predetermined flight path.

9. The system of claim 1, wherein said means for applying knowledge-based rules to the event data and the at least one of ATIS, D-ATIS, AWOS, LLWAS, TCAS, ACARS and airport operations data to determine possible causes of the event comprises means for applying the knowledge-based rules in real time to the event data.

10. The system of claim 1, wherein said means for applying knowledge-based rules to the event data and the at least one of ATIS, D-ATIS, AWOS, LLWAS, TCAS, ACARS and airport operations data to determine possible causes of the event comprises means for post-processing the knowledge-based rules to stored event data.

11. The system of claim 1, wherein airport operations data comprises one or more of Runways and types of approaches in use; Runway category of operation, Category I, II, III; Runway visual range (visibility on each runway); Airports operating in instrument of visual conditions (IFR/VFR operations); NOTAMS in effect ("notices to airmen"); Status of radar services at the airport and other nearby airports; Runways that are closed; Portions of taxiways that are closed; Construction crews working at the airport; Average runway occupancy time by aircraft type; and Average taxi time by aircraft type.

12. A method for automatically providing combined digital data in a form integrated with at least one of flight tracks, noise events, and complaint data, the method comprising the steps of:
receiving flight track data,
comparing the flight track data to a set of predetermined parameters to determine if an event has occurred and producing event data,
receiving at least one of ATIS, D-ATIS, AWOS, LLWAS, TCAS, ACARS and airport operations data, and
applying knowledge-based rules to the event data and the at least one of ATIS, D-ATIS, AWOS, LLWAS, TCAS, ACARS and airport operations data to determine possible causes of the event.

13. The method of claim 12, wherein the step of receiving flight track data comprises the step of multilaterating radio signals received from the aircraft to generate flight track data.

14. The method of claim 12, wherein the step of receiving flight track data comprises receiving flight track data from a passive radar system.

15. The method of claim 12, wherein the step of receiving flight track data comprises receiving flight track data from an air traffic control radar.

16. The method of claim 12, wherein the step of comparing the flight track data to a set of predetermined parameters to determine if an event has occurred and producing event data comprises the step of detecting altitude exceedance of a flight track from a predetermined flight path.

17. The method of claim 12, wherein the step of comparing the flight track data to a set of predetermined parameters to determine if an event has occurred and producing event data comprises the step of detecting a long duration lateral exceedance of a flight track from a predetermined flight path for more than a predetermined period of time.

18. The method of claim 12, wherein the step of comparing the flight track data to a set of predetermined parameters to determine if an event has occurred and producing event data comprises the step of detecting a short duration lateral exceedance of a flight track from a predetermined flight path for less than a predetermined period of time.

19. The method of claim 12, wherein the step of comparing the flight track data to a set of predetermined parameters to determine if an event has occurred and producing event data comprises the step of detecting at least one of a speed or thrust exceedance of a flight track from a predetermined flight path.

20. The method of claim 12, wherein the step of applying knowledge-based rules to the event data and the at least one of ATIS, D-ATIS, AWOS, LLWAS, TCAS, ACARS and airport operations data to determine possible causes of the event comprises the step of applying the knowledge-based rules in real time to the event data.

21. The method of claim 12, wherein the step of applying knowledge-based rules to the event data and the at least one of ATIS, D-ATIS, AWOS, LLWAS, TCAS, ACARS and airport operations data to determine possible causes of the event comprises the step of post-processing the knowledge-based rules to stored event data.

22. The method of claim 12, wherein airport operations data comprises one or more of Runways and types of approaches in use, Runway category of operation, Category I, II, III, Runway visual range (visibility on each runway), Airports operating in instrument of visual conditions (IFR/VFR operations), NOTAMS in effect ("notices to airmen"), Status of radar services at the airport and other nearby airports, Runways that are closed, Portions of taxiways that are closed, Construction crews working at the airport, Average runway occupancy time by aircraft type, and Average taxi time by aircraft type.

23. A system for automatically providing combined digital data in a form integrated with at least one of flight tracks, noise events, and complaint data, the system comprising:
means for receiving flight track data;
means for comparing the flight track data to a set of predetermined parameters to determine if an event has occurred and producing event data;
means for receiving at least one of ATIS, D-ATIS, AWOS, LLWAS, TCAS, ACARS and airport operations data; and
means for correlating the event data to at least one of ATIS, D-ATIS, AWOS, LLWAS, TCAS, ACARS and airport operations data,
wherein said means for applying knowledge-based rules to the event data and the at least one of ATIS, D-ATIS, AWOS, LLWAS, TCAS, ACARS and airport operations data to determine possible causes of the event comprises means for applying the knowledge-based rules in real time to the event data.

24. The system of claim 23, wherein said means for receiving flight track data comprises a multilateration system for determining aircraft flight track by multilaterating radio signals received from the aircraft.

25. The system of claim 23, wherein said means for receiving flight track data comprises a passive radar system.

26. The system of claim 23, wherein said means for receiving flight track data comprises an air traffic control radar.

27. The system of claim 23, wherein said means for comparing the flight track data to a set of predetermined parameters to determine if an event has occurred and producing event data comprises:
means for detecting altitude exceedance of a flight track from a predetermined flight path.

28. The system of claim 23, wherein said means for comparing the flight track data to a set of predetermined parameters to determine if an event has occurred and producing event data comprises:
means for detecting a long duration lateral exceedance of a flight track from a predetermined flight path for more than a predetermined period of time.

29. The system of claim 23, wherein said means for comparing the flight track data to a set of predetermined parameters to determine if an event has occurred and producing event data comprises:
means for detecting a short duration lateral exceedance of a flight track from a predetermined flight path for less than a predetermined period of time.

30. The system of claim 23, wherein said means for comparing the flight track data to a set of predetermined parameters to determine if an event has occurred and producing event data comprises:
means for detecting at least one of a speed or thrust exceedance of a flight track from a predetermined flight path.

31. A system for automatically providing combined digital data in a form integrated with at least one of flight tracks, noise events, and complaint data, the system comprising:

means for receiving flight track data;

means for comparing the flight track data to a set of predetermined parameters to determine if an event has occurred and producing event data;

means for receiving at least one of ATIS, D-ATIS, AWOS, LLWAS, TCAS, ACARS and airport operations data; and means for correlating the event data to at least one of ATIS, D-ATIS, AWOS, LLWAS, TCAS, ACARS and airport operations data, wherein said means for applying knowledge-based rules to the event data and the at least one of ATIS, D-ATIS, AWOS, LLWAS, TCAS, ACARS and airport operations data to determine possible causes of the event comprises means for post-processing the knowledge-based rules to stored event data.

32. A method for automatically providing combined digital data in a form integrated with at least one of flight tracks, noise events, and complaint data, the method comprising the steps of:

receiving flight track data, comparing the flight track data to a set of predetermined parameters to determine if an event has occurred and producing event data, receiving at least one of ATIS, D-ATIS, AWOS, LLWAS, TCAS, ACARS and airport operations data, and correlating the event data to the at least one of ATIS, D-ATIS, AWOS, LLWAS, TCAS, ACARS and airport operations data, wherein the step of applying knowledge-based rules to the event data and the at least one of ATIS, D-ATIS, AWOS, LLWAS, TCAS, ACARS and airport operations data to determine possible causes of the event comprises the step of applying the knowledge-based rules in real time to the event data.

33. The method of claim 32, wherein the step of receiving flight track data comprises the step of multilaterating radio signals received from the aircraft to generate flight track data.

34. The method of claim 32, wherein the step of receiving flight track data comprises receiving flight track data from a passive radar system.

35. The method of claim 32, wherein the step of receiving flight track data comprises receiving flight track data from an air traffic control radar.

36. The method of claim 32, wherein the step of comparing the flight track data to a set of predetermined parameters to determine if an event has occurred and producing event data comprises the step of detecting altitude exceedance of a flight track from a predetermined flight path.

37. The method of claim 32, wherein the step of comparing the flight track data to a set of predetermined parameters to determine if an event has occurred and producing event data comprises the step of detecting a long duration lateral exceedance of a flight track from a predetermined flight path for more than a predetermined period of time.

38. The method of claim 32, wherein the step of comparing the flight track data to a set of predetermined parameters to determine if an event has occurred and producing event data comprises the step of detecting a short duration lateral exceedance of a flight track from a predetermined flight path for less than a predetermined period of time.

39. The method of claim 32, wherein the step of comparing the flight track data to a set of predetermined parameters to determine if an event has occurred and producing event data comprises the step of detecting at least one of a speed or thrust exceedance of a flight track from a predetermined flight path.

40. The method of claim 32, wherein airport operations data comprises one or more of Runways and types of approaches in use, Runway category of operation, Category I, II, III, Runway visual range (visibility on each runway), Airports operating in instrument of visual conditions (IFR/VFR operations), NOTAMS in effect ("notices to airmen"), Status of radar services at the airport and other nearby airports, Runways that are closed, Portions of taxiways that are closed, Construction crews working at the airport, Average runway occupancy time by aircraft type, and Average taxi time by aircraft type.

41. A method for automatically providing combined digital data in a form integrated with at least one of flight tracks, noise events, and complaint data, the method comprising the steps of:

receiving flight track data, comparing the flight track data to a set of predetermined parameters to determine if an event has occurred and producing event data, receiving at least one of ATIS, D-ATIS, AWOS, LLWAS, TCAS, ACARS and airport operations data, and correlating the event data to the at least one of ATIS, D-ATIS, AWOS, LLWAS, TCAS, ACARS and airport operations data, wherein the step of applying knowledge-based rules to the event data and the at least one of ATIS, D-ATIS, AWOS, LLWAS, TCAS, ACARS and airport operations data to determine possible causes of the event comprises the step of post-processing the knowledge-based rules to stored event data.

* * * * *